United States Patent
Gegner

(10) Patent No.: US 7,809,594 B2
(45) Date of Patent: Oct. 5, 2010

(54) SYSTEM AND METHOD FOR THE DYNAMIC REPRESENTATION OF THE ACTUAL STATE OF A TASK IN RELATION TO A TARGET STATE

(75) Inventor: Günter Gegner, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 1567 days.

(21) Appl. No.: 10/493,255

(22) PCT Filed: Oct. 15, 2002

(86) PCT No.: PCT/DE02/03899

§ 371 (c)(1),
(2), (4) Date: Apr. 16, 2004

(87) PCT Pub. No.: WO03/038538

PCT Pub. Date: May 8, 2003

(65) Prior Publication Data

US 2005/0015769 A1    Jan. 20, 2005

(30) Foreign Application Priority Data

Oct. 22, 2001    (DE)    ................................. 101 51 938

(51) Int. Cl.
*G06F 17/50*    (2006.01)
(52) U.S. Cl. .................................. 705/7; 714/37; 705/8
(58) Field of Classification Search ...................... 705/8, 705/7; 714/37
See application file for complete search history.

(56) References Cited

U.S. PATENT DOCUMENTS

| | | | | |
|---|---|---|---|---|
| 5,617,327 A | * | 4/1997 | Duncan | ........................ 703/14 |
| 5,774,738 A | * | 6/1998 | Hillan | ............................ 712/1 |
| 5,893,905 A | * | 4/1999 | Main et al. | ..................... 705/11 |
| 5,914,875 A | | 6/1999 | Monta et al. | |
| 6,023,702 A | * | 2/2000 | Leisten et al. | ....................... 1/1 |
| 6,400,410 B1 | * | 6/2002 | Timmer et al. | .............. 348/571 |
| 6,665,648 B2 | * | 12/2003 | Brodersen et al. | .............. 705/7 |
| 6,941,519 B1 | * | 9/2005 | Jerome et al. | ................ 715/744 |

(Continued)

FOREIGN PATENT DOCUMENTS

DE    198 25 733 A1    12/1999

(Continued)

OTHER PUBLICATIONS

Cagle, Steven R; Barrera, Trishalu. Implementing your CAPA tracking system. Pharmaceutical Technology pp. 2-22 2000 from dialog file 15: 02070509.*

(Continued)

*Primary Examiner*—Johnna Loftis

(57) ABSTRACT

The invention relates to a system and a method for the dynamic representation of the actual state of a task. The aim of the invention is to provide a clear and explicit representation of a task. To this end, the processing state is represented as the actual state of a task in such a way that the representation is carried out as a dynamic representation of the actual state in relation to a target state. The user is thus provided with a visual reference relating to, for example, a processing, producing and/or logistics target. The clarity can be further increased by associating additional information characterizing the state of the tasks to the actual states of the tasks.

19 Claims, 3 Drawing Sheets

U.S. PATENT DOCUMENTS 7,155,715 B1 * 12/2006 Cui et al. .................... 717/177

FOREIGN PATENT DOCUMENTS

| DE | 100 51 456 A1 | 4/2002 |
|---|---|---|
| WO | WO 00/17773 | 3/2000 |
| WO | WO 01/57606 A1 | 8/2001 |

OTHER PUBLICATIONS

Booch, Grady; Rumbaugh, James; Jacobson, Ivar. The Unified Modeling Language User Guide. Rational Software Corporation. 1998.*

Harel, D.; Lachover, H.; Naamad, A.; Pnueli, A.; Politi, M.; Sherman, R.; Shtul-Trauring, A. Statemate: A Working Environment for the Development of Complex Reactive Systems. I-Logix Inc., Burlington, MA and Ad Cad Ltd., Rehovot, Israel. 1988 IEEE.*

Harel, David. Statecharts: A Visual Formalism for Complex Systems. Science of Computer Programming 9 (1987) p. 231-274.*

Harel, David; Naamad, Amnon. The STATEMATE Semantics of Statecharts. ACM Transactions on Software Engineering and Methodology, vol. 5, No. 4, Oct. 1996. pp. 293-333.*

Muth, Peter; Wodtke, Dirk; WeiBenfels, Jeanine; Weikum, Gerhard; Dittrich, Angelika Kotz. Enterprise-wide Workflow Management based on State and Activity Charts. NATO Advanced Study Institute on Workflow Systems and Interoperability. 1997.*

Weske, Mathias. Flexible Modeling and Execution of Workflow Activities. 1998 IEEE.*

* cited by examiner

US 7,809,594 B2

SYSTEM AND METHOD FOR THE DYNAMIC REPRESENTATION OF THE ACTUAL STATE OF A TASK IN RELATION TO A TARGET STATE

CROSS REFERENCE TO RELATED APPLICATIONS

This application is the US National Stage of International Application No. PCT/DE02/03899, filed Oct. 15, 2002 and claims the benefit thereof. The International Application claims the benefits of German application No. 10151938.9 filed Oct. 22, 2001, both of the applications are incorporated by reference herein in their entirety.

FIELD OF INVENTION

The invention relates to a system and method for the dynamic representation the actual state of a task in relation a target state.

BACKGROUND OF INVENTION

A system of this kind is used, for example, in the field of production and/or process automation where a graphical and visual display of task states, e.g. in the form a bar charts, via a control console is often required. Displays of this kind are often provided with a large amount of information and are not therefore particularly clear, especially for inexperienced users.

WO 00/17773 A2 discloses a system for displaying logistics information relating to a supply chain. The system comprises a presentation interface via which a plurality of icons and a plurality of links can be displayed, said icons representing entities of a task or of a supply chain.

SUMMARY OF INVENTION

The object of the invention is to specify a system and method for clearly displaying task states.

The invention is based on the recognition that the display of actual states of a task chain, characterizing e.g. certain processing or logistics states, is unclear particularly to inexperienced users if said states are displayed only in the form of bar charts or purely as text, and that a much clearer and more informative display format can be achieved by always displaying the relevant actual states of a task or task chain in relation to a target state. For a display of this kind, the system first requires the entering of target information data. This target information data is stored in a memory of the computer device. The target information data is acquired from a real process or a real production situation using the data acquisition facility and displayed on the visualization means. In addition, the actual information data is analyzed using an evaluation device in relation to the specified target information data. The results of this analysis are in turn visualized in the form of the current actual states of the tasks in relation to the relevant target states. Altogether this provides much better display clarity which also allows direct conflict detection, i.e. a collision of two or more tasks.

The information content for the user can be further increased by designing the evaluation facility for analyzing the actual information data and the target information data in such a way that additional information characterizing the relevant task state is determined therefrom and displayed using the visualization means.

A representation of task states that can be easily understood even by inexperienced users can be achieved by designing the system to determine and display a visual reference to a processing, production and/or logistics target of a task.

An advantageous application of the system consists in linking the system to an MES, MIS and/or HMI system or incorporating it in a system of this kind.

A display format tailored to requirements can be achieved by providing the system with means for selecting different levels of actual states, particularly in respect of individual tasks, one or more groups of tasks, individual departments and/or machines of a process and/or a production system and/or of a general display of all the tasks of a process and/or a production system.

A graphical visualization of resulting task conflicts, even predictive, can be ensured by providing the system with means for visualizing task conflicts.

Particularly in the case of complex display formats, clarity can be further improved by designing the visualization equipment for three-dimensional representation of the processing states of the tasks.

BRIEF DESCRIPTION OF THE DRAWINGS

The invention will now be described in further detail and explained with reference to the exemplary embodiments illustrated in the Figures, in which.

DETAILED DESCRIPTION OF INVENTION

Figure 1:
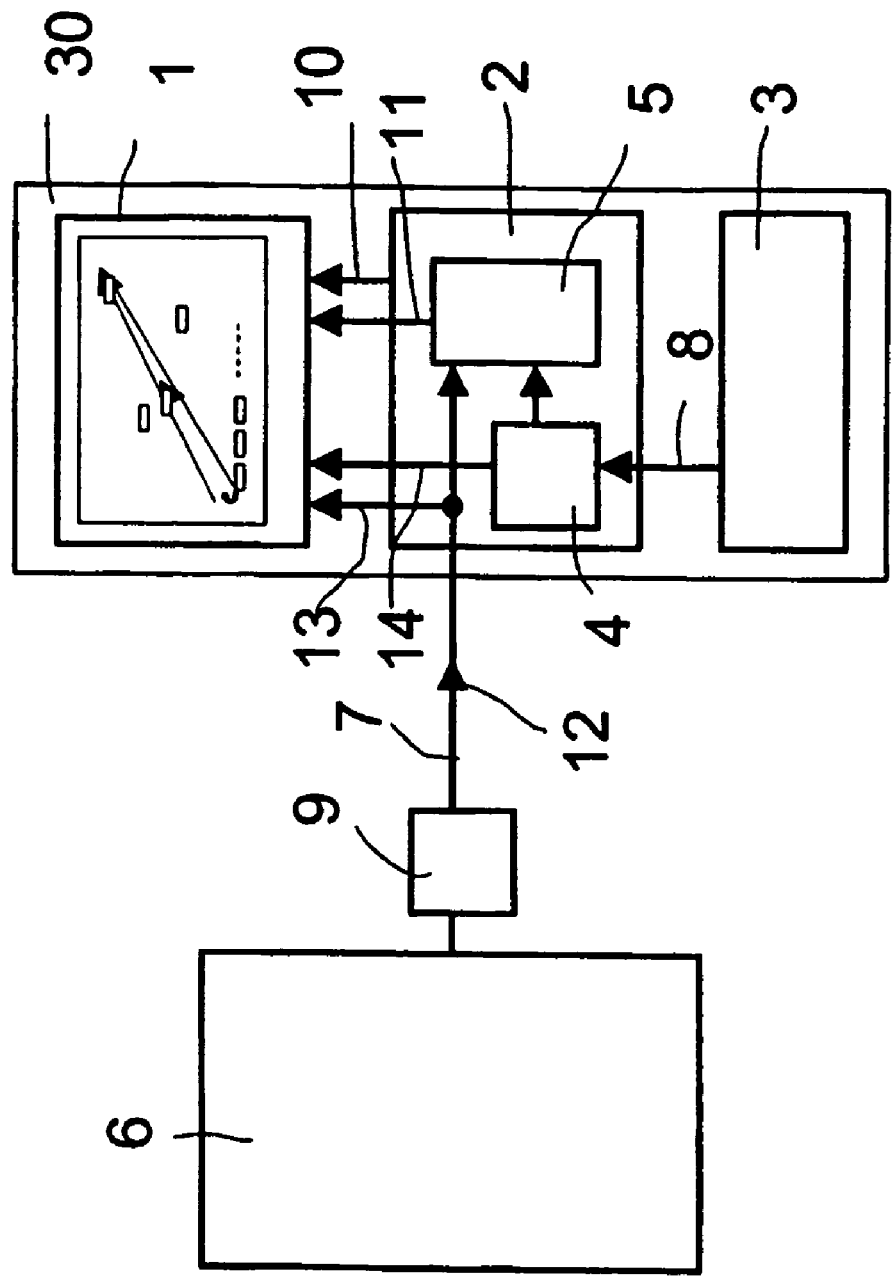
FIG. 1 shows a block diagram of an exemplary embodiment of a system for dynamically displaying the actual state of a task in relation to a target state.

FIG. 1 shows a block schematic of an embodiment of a system 30 for dynamically displaying the actual states of tasks in relation to a target state or a plurality of target states. The system 30 comprises a computer device 2, a visualization device 1 and an entry facility 3. The system 30 is connected to a production system 6 or a process via a data link 7. Using a data acquisition facility 9, actual information data 12 is acquired from the process or production system 6 and forwarded to the data processing device 2. The data processing facility comprises a memory 4 for storing target information 8 which is entered in the memory via the entry facility 3 or read into the memory 4 by some other known means. The data processing facility additionally comprises an evaluation device 5 for analyzing the actual information data 7 and the target information data 8 stored in the memory 4. The arrows 10,11,13,14 between the data processing facility 2 and the visualization device 1 serve to indicate that corresponding data from the data processing facility 2 is displayed on the screen 1, as will be explained in greater detail in connection with FIG. 2 in particular.

The distinctive feature of the system illustrated in FIG. 1 is primarily that the data processing facility 2 analyzes the acquired actual information data 12 in the evaluation device 5 in relation to the target information data 8 stored in the memory 4 and transmits the information obtained from this analysis to the visualization device 1, said visualization device 1 using a target-oriented representation of the relevant actual states of the task data. Altogether this produces a visual reference to a processing, production or logistics target, said target possibly being completion of overall processing or of partial processing or of an operation. The target-oriented display provides a higher degree of clarity, with the possibility of direct conflict detection, the visualization device 1 using dynamic representation of the actual information data and of the corresponding target information data, so that a current task situation can be rapidly identified and intervention in the process or the underlying production can take place if necessary.

Figure 2:
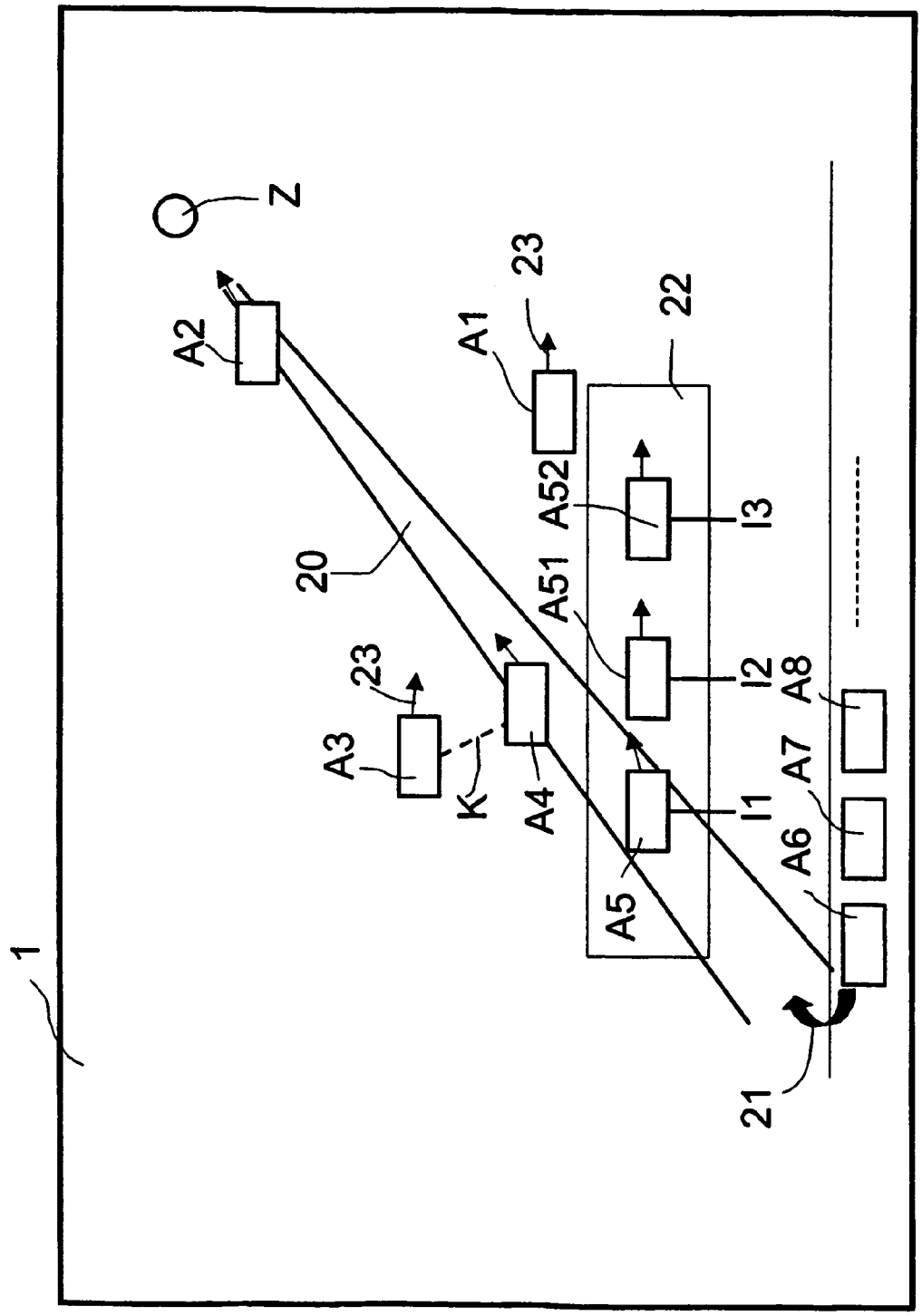
FIG. 2 shows an exemplary graphical display of a task chain with tasks shown in relation to a target state.

FIG. 2 shows a typical graphical display of a task chain consisting of tasks A1 . . . A8 in relation to a target state Z in each case, the tasks A6,A7,A8 being so-called waiting tasks prior to entry, indicated by an arrow 21, into a target corridor 20 shown shaded in FIG. 2. The target corridor 20 contains tasks A2,A4,A5, whereas the tasks A1,A3 are outside the target corridor 20. In the exemplary embodiment shown in FIG. 2, each task A1 . . . A8 is assigned additional information 23 characterizing the "direction" of further processing as a preview symbol. The display format oriented to the target Z on the screen 1 therefore produces a clear representation of the relevant task states A1 . . . An even for an inexperienced observer. Thus, for example, the observer and user can detect from the current states of the tasks A3,A4 that a collision situation is present. However, a collision situation of this kind can also be automatically visualized to the user e.g. in the form of a dashed line K. To this end the clarity can be increased still further by displaying tasks at risk of collision, e.g. the tasks A3,A4 in the exemplary embodiment in FIG. 2, in conspicuous colors, for example, particularly red, or providing them with additional warnings, etc.

By way of example, FIG. 2 shows a shaded field 22 designed to illustrate the dynamic display format of the tasks. The shaded field 22 contains the task A5 at different points in time, symbolized by the different task designations A5,A51, A52 as well as by different actual states I1,I2,I3. In the actual state I1, the task A5 already shows a slight deviation from the target corridor 20, this being specifically indicated by the additional information of the arrow 23. Altogether the direct target reference in conjunction with the dynamic display of the actual states I1,I2,I3 produce an informative layout, even for inexperienced users.

Figure 3:
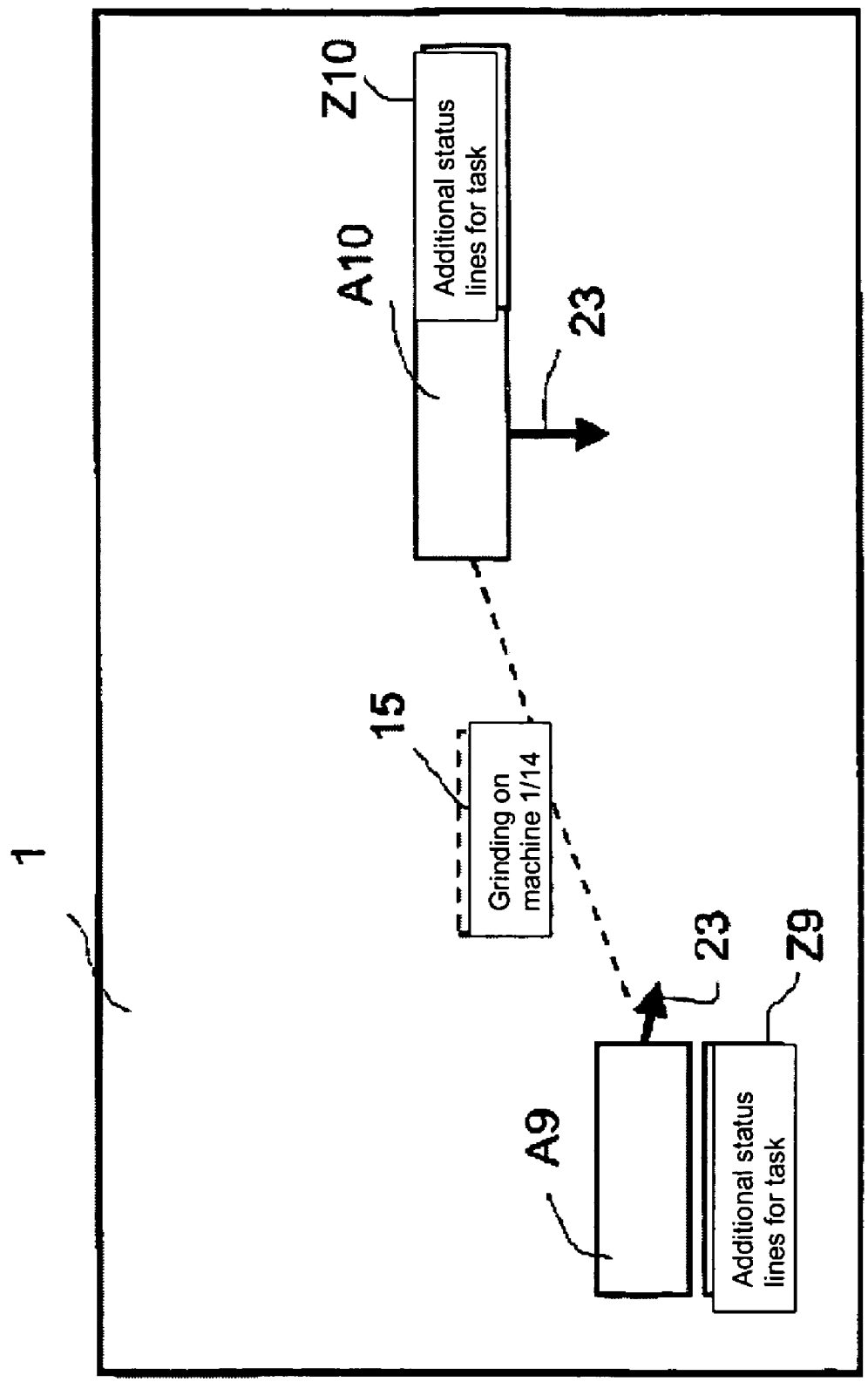
FIG. 3 shows an exemplary graphical display of tasks augmented by additional information.

FIG. 3 shows an exemplary graphical display of tasks, each augmented by additional information. The display again appears in a screen window 1 showing two tasks A9,A10 by way of example. The current "direction" of further processing is again visualized using the arrow 23 already explained in connection with FIG. 2, i.e. a visualization of the dynamic processing state. In the exemplary embodiment illustrated in FIG. 3, there are also provided further additional data fields Z9,Z10 each containing additional status lines for the relevant task A9,A10. A collision data field 15 is additionally present which contains collision warnings. The display format of the task icons A9,A10 can use different colors to improve clarity, the color information even providing an indication of the processing state. For example, the color green can mean that a task is in planning, the color yellow indicates a delayed task, whereas red means that the task has been halted. Using the display formats shown in FIGS. 2 and 3, genuine and meaningful three-dimensional information conditioning can therefore be achieved as and when required, e.g. using appropriate 3D spectacles for 3D display and recognition.

To summarize, the invention therefore relates to a system and method for dynamically displaying the actual state I1 . . . In of a task A1 . . . An. For a clear and informative representation of a task A1 . . . An, it is proposed to display the processing state as an actual state I1 . . . In of a task A1 . . . An in such a way that it is displayed in each case as a dynamic actual state representation in relation to a target state Z1 . . . Zn. Altogether this therefore provides the user with a visual reference e.g. to a processing, production and/or logistics target. The clarity can be increased still further by assigning the actual states of the tasks A1 . . . An additional information characterizing the task state.

The invention claimed is:

1. A system for dynamically displaying an actual state of tasks in a production system, comprising:
    a device configured to enter target information data assigned to a target state for a plurality of tasks into a memory of a computer device;
    at least one data acquisition facility connected to the computer device and configured to acquire actual information data of a production system;
    an evaluation device in the computer device configured to analyze the actual information data and to derive actual processing states and processing directions of the tasks over time in relation to the target state; and
    a visualizing device connected to the computer device, wherein the visualizing device is configured to display the processing states of the tasks so that the actual processing states of the tasks derived from the actual information data are dynamically displayed in relation to the target state;
    wherein the system is configured to display the processing states and processing directions of the tasks by respective graphical task symbols on the visualizing device in relation to a graphical target corridor that converges toward a target state symbol representing the target state on the visualizing device;
    wherein a task waiting to be started is represented by a task symbol in a graphical area on the visualizing device outside the target corridor at a distal end of the target corridor relative to the target state symbol; and
    wherein two tasks with a predicted conflict are displayed on the visualizing device by two task symbols with respective processing direction preview symbols extending in convergent directions relative to each other.

2. The system according to claim 1, wherein the evaluation device is configured to determine additional information characterizing task states from the actual information data and the target information data, and to display said additional information on at least some of the task symbols on the visualization device.

3. The system according to claim 1, wherein the system is configured to determine and display a visual reference to a processing, production and/or logistics target of a task.

4. The system according to claim 1, wherein the system is configured to be linked to an MES, MIS, and/or HMI system or incorporated in a system of this kind.

5. The system according to claim 1, wherein the system is configured to select different levels of actual states from the group consisting of: individual tasks, one or more groups of tasks, individual departments, machines of a process, machines of a production system, a general representation of all the tasks of a process, a general representation of all the tasks of a production system, and combinations thereof.

6. The system according to claim 1, wherein the visualization device is configured to display the processing states of the tasks three-dimensionally.

7. The system of claim 1 wherein:
    each task symbol is shown either moving toward the target corridor, moving away from the target corridor, awaiting entry into the target corridor, following the target corridor toward the target state symbol, or deviating from a processing direction toward the target symbol from within the target corridor; and wherein each task symbol visually represents the processing state of a given task of the process and/or a production system relative to the target state.

8. The system of claim 7, wherein the conflict is further represented by a graphical connecting line displayed between the two respective task symbols.

9. A method for dynamically displaying an actual state of tasks of a production system in relation to a target state of the tasks, comprising:
   assigning target information data to a target state of tasks of a production system;
   entering the target information data into a memory of a computer device;
   acquiring actual information data of the tasks via an acquisition facility connected to both the production system and the computer device;
   evaluating the actual information data in relation to the target information data in an evaluation element of the computer device to derive a processing state and a processing direction of each of the tasks relative to the target state; and
   dynamically displaying the processing state and the processing direction of each task in graphical symbolic forms on a display screen connected to the computer device;
   wherein the processing state and the processing direction of each task are displayed on the display screen by a respective task symbol for each task shown in relation to a graphical target corridor that converges to a target state symbol on the display screen;
   wherein the processing directions of active ones of the tasks are represented by an arrow extending from each active task symbol, and at least one of the arrows points in a direction that diverges from the processing corridor, and at least one of the arrows points toward the processing corridor from an active task symbol outside the processing corridor.

10. The method of claim 9, further comprising displaying the task symbols of waiting tasks in a graphical waiting area outside the target corridor at a distal end of the target corridor relative to the target symbol, wherein an arrow points from the waiting area into the distal end of the target corridor.

11. The method of claim 9, further comprising displaying a respective symbol of a task in planning in a first color, that of a delayed task in a second color, and that of a halted task in a third color.

12. The method of claim 9, further comprising displaying multiple task symbols for a given task in a given graphical area of the screen, the multiple task symbols representing the processing state and processing direction of the task at different points in time.

13. The method according to claim 9, wherein the actual information data and the target information data are analysed so that additional information characterizing each task state is determined and displayed on the display screen.

14. The method according to claim 9, wherein the method is designed to determine and display a visual reference to a processing, production and/or logistics target of each task.

15. The method according to claim 9, wherein the method is used in conjunction with an MES, MIS, and/or HMI system.

16. The method according to claim 9, wherein different levels of actual states can be selected for a group consisting of: individual tasks, one or more groups of tasks, individual departments, machines of a process, machines of a production system, a general representation of all the tasks of a process, a general representation of all the tasks of a production system, and combinations thereof.

17. The method according to claim 9, wherein conflicts of tasks are displayed by a convergence of respective processing direction arrows relative to each other on two of the task symbols.

18. The method according to claim 9, wherein the processing states of the tasks are conditioned for three-dimensional display.

19. The method according to claim 9, wherein the method is implemented in a computer program when the computer program is run on a computer device.

* * * * *